US012377295B2

(12) United States Patent
Couzyn (10) Patent No.: US 12,377,295 B2
(45) Date of Patent: Aug. 5, 2025

(54) COUNTERLUNG FOR A REBREATHING APPARATUS

(71) Applicant: Rhys James Couzyn, Ballito (ZA)

(72) Inventor: Rhys James Couzyn, Ballito (ZA)

(73) Assignee: Johnson Outdoors Inc., Racine, WI (US)

( * ) Notice: Subject to any disclaimer, the term of this patent is extended or adjusted under 35 U.S.C. 154(b) by 879 days.

(21) Appl. No.: 16/972,827

(22) PCT Filed: Apr. 15, 2019

(86) PCT No.: PCT/IB2019/053073
§ 371 (c)(1),
(2) Date: Dec. 7, 2020

(87) PCT Pub. No.: WO2019/234514
PCT Pub. Date: Dec. 12, 2019

(65) Prior Publication Data
US 2021/0244975 A1    Aug. 12, 2021

(30) Foreign Application Priority Data
Jun. 6, 2018    (GB) ........................................ 180925

(51) Int. Cl.
*A62B 7/02*    (2006.01)
*A62B 7/10*    (2006.01)
(Continued)

(52) U.S. Cl.
CPC .................. *A62B 7/02* (2013.01); *A62B 7/10* (2013.01); *A62B 9/00* (2013.01); *B63C 11/24* (2013.01)

(58) Field of Classification Search
CPC .... A62B 7/00; A62B 7/02; A62B 7/10; A62B 9/00; B63C 11/14; B63C 11/18;
(Continued)

(56) References Cited

U.S. PATENT DOCUMENTS 3,526,223 A * 9/1970 Curtis ...................... B64G 6/00
165/104.31
3,630,207 A * 12/1971 Kahn .................... A61M 27/00
604/524

(Continued)

FOREIGN PATENT DOCUMENTS

| GB | 2440315 A | 1/2008 |
| JP | H1024896 A | 1/1998 |
| WO | 2007136792 A2 | 11/2007 |

*Primary Examiner* — Colin W Stuart
*Assistant Examiner* — Matthew D Ziegler
(74) *Attorney, Agent, or Firm* — Reinhart Boerner Van Deuren P.C.

(57) ABSTRACT

A breathing hose is configured to duct inhaled and exhaled gas between a user and a rebreather apparatus. The breathing hose includes a non-collapsible flexible outer tube and a collapsible inner tube located within the non-collapsible flexible outer tube. The collapsible inner tube is configured to inflate to accommodate the exhaled gas of the user and to deflate to accommodate the inhaled gas of the user. The collapsible inner tube has a size that accommodates at least a portion of a breath volume of the user and may have a size that is configured to accommodate a maximum breath volume of the user. The collapsible inner tube is configured to act to maintain a constant total volume of gas in the lungs of the user and in the rebreather unit throughout a breathing cycle. The breathing hose may be part of a closed-circuit or semi closed-circuit rebreather apparatus.

13 Claims, 8 Drawing Sheets

(51) Int. Cl.
*A62B 9/00* (2006.01)
*B63C 11/24* (2006.01)

(58) Field of Classification Search
CPC .......... B63C 11/22; B63C 11/24; F16L 11/11;
F16L 11/20; F16L 57/00; A61M 16/0045;
A61M 16/042; A61M 16/0891
See application file for complete search history.

(56) References Cited

U.S. PATENT DOCUMENTS

| | | | | |
|---|---|---|---|---|
| 3,964,476 | A * | 6/1976 | Palleni | A61M 16/08 |
| | | | | 128/205.24 |
| 4,701,160 | A * | 10/1987 | Lindsay | A61M 39/0613 |
| | | | | 604/158 |
| 4,964,404 | A | 10/1990 | Stone | |
| 5,161,773 | A * | 11/1992 | Tower | A61M 39/0613 |
| | | | | 251/5 |
| 6,458,097 | B1 * | 10/2002 | Boussignac | A61M 25/0043 |
| | | | | 604/103.08 |
| 6,874,500 | B2 * | 4/2005 | Fukunaga | A61M 16/0081 |
| | | | | 128/911 |
| 8,459,263 | B2 * | 6/2013 | Reynolds | B63C 11/2227 |
| | | | | 128/205.12 |
| 8,740,175 | B2 * | 6/2014 | Kawamura | B67C 3/28 |
| | | | | 251/5 |
| 9,480,791 | B2 * | 11/2016 | Reilly | A61M 5/1422 |
| 2010/0242966 | A1 | 9/2010 | Johnson | |
| 2012/0174920 | A1 * | 7/2012 | Barkai | A61M 16/04 |
| | | | | 128/200.26 |

\* cited by examiner

Fig. 8 ated herein
COUNTERLUNG FOR A REBREATHING APPARATUS

CROSS REFERENCE TO RELATED APPLICATION

This application is a national stage entry under 35 U.S.C. 371 of PCT Patent Application No. PCT/IB2019/053073, filed Apr. 15, 2019, which claims priority to United Kingdom Patent Application No. 1809259.3, filed Jun. 6, 2018, the entire contents of each of which are incorporated herein by reference.

BRIEF DESCRIPTION OF THE DRAWINGS

The accompanying drawings are part of this disclosure and are incorporated into the specification. The drawings illustrate example embodiments of the disclosure and, in conjunction with the description and claims, serve to explain various principles, features, or aspects of the disclosure. Certain embodiments of the disclosure are described more fully below with reference to the accompanying drawings. However, various aspects of the disclosure may be implemented in many different forms and should not be construed as being limited to the implementations set forth herein. Like numbers refer to like, but not necessarily the same or identical, elements throughout.

BACKGROUND

A rebreather is a breathing apparatus that absorbs carbon dioxide from a user's exhaled breath so as to allow the substantially unused Oxygen and Nitrogen in the breath to be recycled and rebreathed. By adding sufficient oxygen to compensate for the metabolic usage, removing the carbon dioxide, and rebreathing the gas, most of the volume is conserved.

Rebreather apparatus differs from open-circuit breathing apparatus, where the exhaled gas is discharged directly into the environment.

One of the requirements of a rebreather device is that it include a counterlung or breathing bag which holds gas when it is not in the diver's lungs. The counterlung is configured to change in volume by the same amount as the user's tidal volume when breathing. This assists in maintaining a constant total volume of gas in the lungs and the rebreather device throughout the breathing cycle. The volume of the counterlung should allow for the maximum likely breath volume of a user.

Tidal volume (symbol VT or TV) is the lung volume representing the normal volume of air displaced between normal inhalation and exhalation when extra effort is not applied. In a healthy, young human adult, tidal volume at rest is approximately 500 mL per inspiration or 7 mL/kg of body mass, however during exercise or when under stress, tidal volume increases significantly and can approach 3 liters to 5 liters, depending on the diver's unique physiology and respiratory needs.

Underwater, the position of the counterlung—on the chest, over the shoulders, or on the back—has an effect on the work of breathing. This is due to the hydrostatic pressure difference between the counterlung and the diver's lungs caused by the vertical distance between the two.

The various locations of the counterlung have their own pros and cons:
  Front mounted counterlung: When horizontal the counterlung is under greater hydrostatic pressure than the diver's lungs. This makes it easier for the diver to inhale, harder to exhale.
  Back mounted counterlung: When horizontal the counterlung is under less hydrostatic pressure than the diver's lungs. The amount of pressure varies, as some counterlungs are located closer to the back than others. This makes it harder for the diver to inhale, and easier to exhale.
  Over the shoulder counterlung: When horizontal, the counterlung is positioned close to the lung centroid, resulting in good breathing characteristics, however the hydrostatic pressure will vary depending on how much gas is in the counterlungs, and increases as the volume increases and the lowest part of the gas space moves downward.

The design of the counterlungs can also affect the swimming diver's streamlining due to location and shape of the counterlungs themselves. Back mounted counterlungs are generally the most streamlined while over the shoulder types offset their good hydrostatic positioning by normally being more bulky than other types.

A further problem faced with traditional rebreather systems, is that the total air volume of the breathing loop includes the counterlung volume (movable portion) as well as the breathing hose volume (immovable portion). This large air volume requires the diver to use lead ballast in order to counteract the buoyant lift of the air volume, adding to the weight of the system.

Disclosed embodiments provide a rebreather which at least partially alleviates some of the above-mentioned problems.

SUMMARY

In accordance with this disclosure there is provided a breathing hose for ducting inhaled and exhaled gas between a user and a rebreather apparatus, the breathing hose comprising a collapsible inner tube located within a non-collapsible flexible outer tube.

There is further provided for the collapsible inner tube to inflate to accommodate the exhaled breath of the user, and to deflate to accommodate the inhaled breath of the user/

Thecollapsible inner tube is sized to accommodate at least a portion of the breath volume of the user, and can be sized to accommodate the maximum breath volume of a user.

The collapsible inner tube functions as an in-hose counterlung.

The collapsible inner tube may be used to complement the function of a traditional counterlung in a rebreather device, by sharing the work of maintaining a constant total volume of gas in the lungs and the rebreather device throughout the breathing cycle.

Alternatively, the collapsible inner tube may replace the traditional counterlung in a rebreather device.

The collapsible inner tube may be in-elastic, with no bias in either the full or empty state, alternatively the collapsible inner tube may be pre-formed with a memory to create positive and/or negative pressure to counteract hydrostatic pressure imbalances, further alternatively, the inner tube may be elastic so as to bias the gas to move through the rebreather apparatus towards the inhale hose.

A hollow member may be located inside the collapsible inner tube, extending along the length of the collapsible inner tube, for preventing the complete collapse of the inner tube under hydrostatic pressure.

The hollow member may include, but is not limited to a hollow tube, or a spiral.

The in-hose counterlung may be used in conjunction with either a Closed Circuit Rebreather, or a Semi-closed Circuit Rebreather.

DETAILED DESCRIPTION

Figure 1:
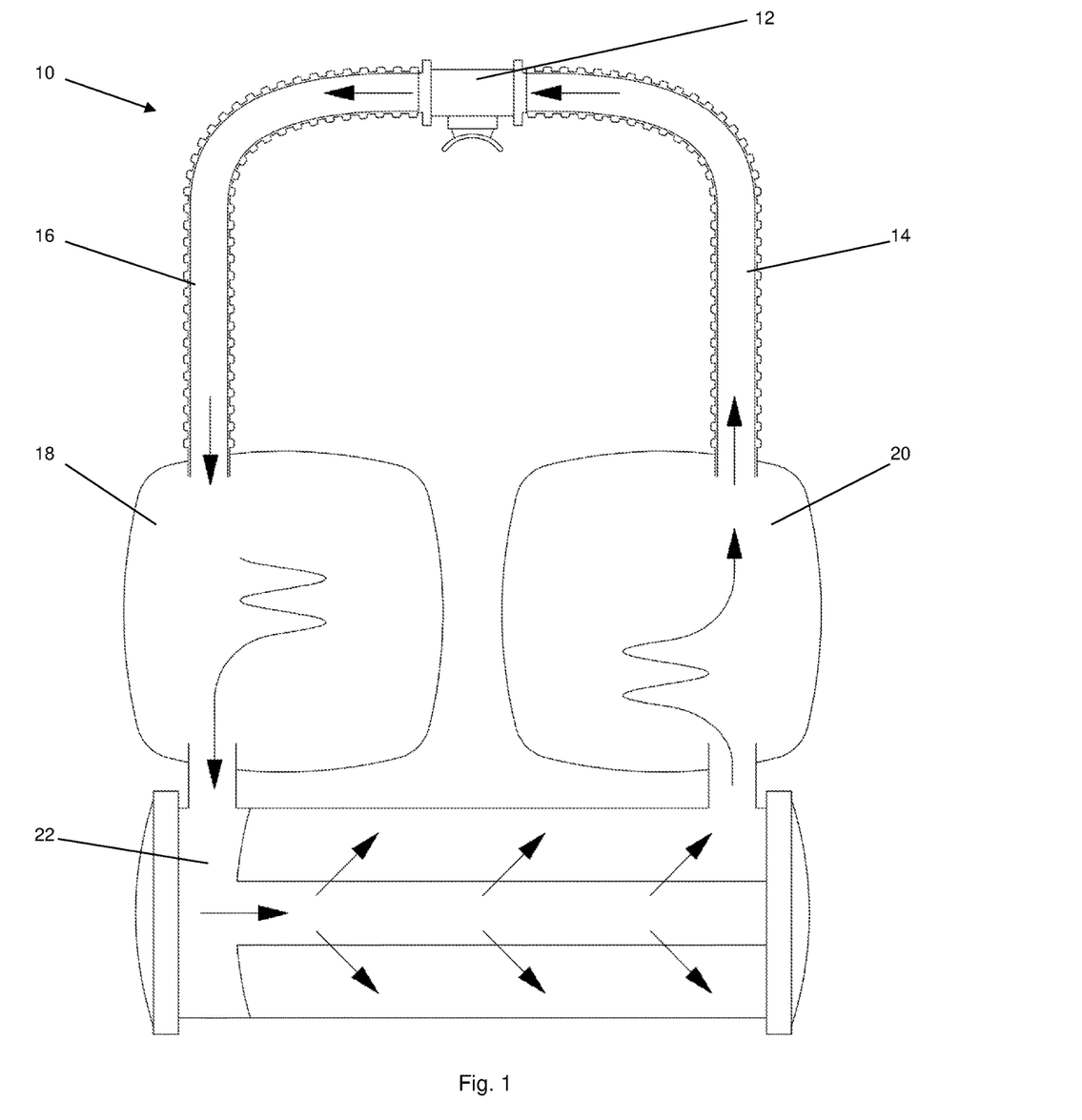
FIG. 1 is a schematic illustrating a traditional rebreather loop for closed circuit and semi-closed circuit rebreathers.

FIG. 1 depicts a traditional rebreather 10 of loop configuration. The rebreather 10 includes a mouthpiece 12 (or full face mask, not shown) through which the diver breathes, connected to an inhale hose 14 and an exhale hose 16. These hoses 14, 16 are generally of corrugated synthetic rubber to allow greater flexibility while retaining a high resistance to collapse. The hoses are configured to provide low resistance to flow of the breathing gas. The hoses 14, 16 are connected to counterlungs 18, 20, which hold gas when it is not in the diver's lungs. The rebreather also includes a scrubber 22 containing carbon dioxide absorbent to remove the carbon dioxide exhaled by the diver. As will be appreciated, because the counterlungs are required to allow for the maximum likely breath volume of a user, they are generally bulky and can negatively affect the swimming diver's streamlining, depending on their shape and where they are located.

Figure 6A:
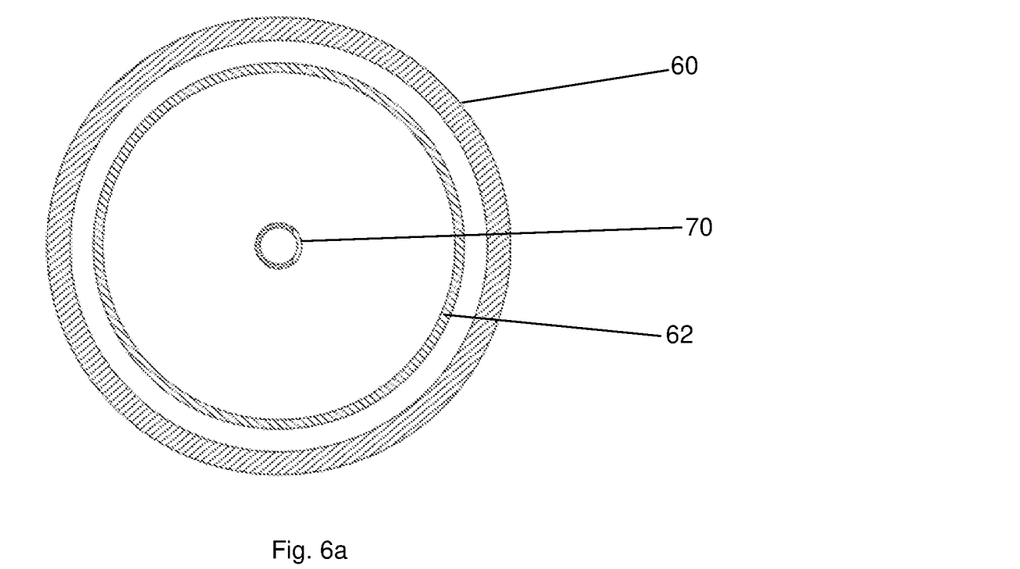
FIG. 6a is a cross sectional view A-A of the breathing hose, with the breathing hose in the inflated state.
Figure 6B:
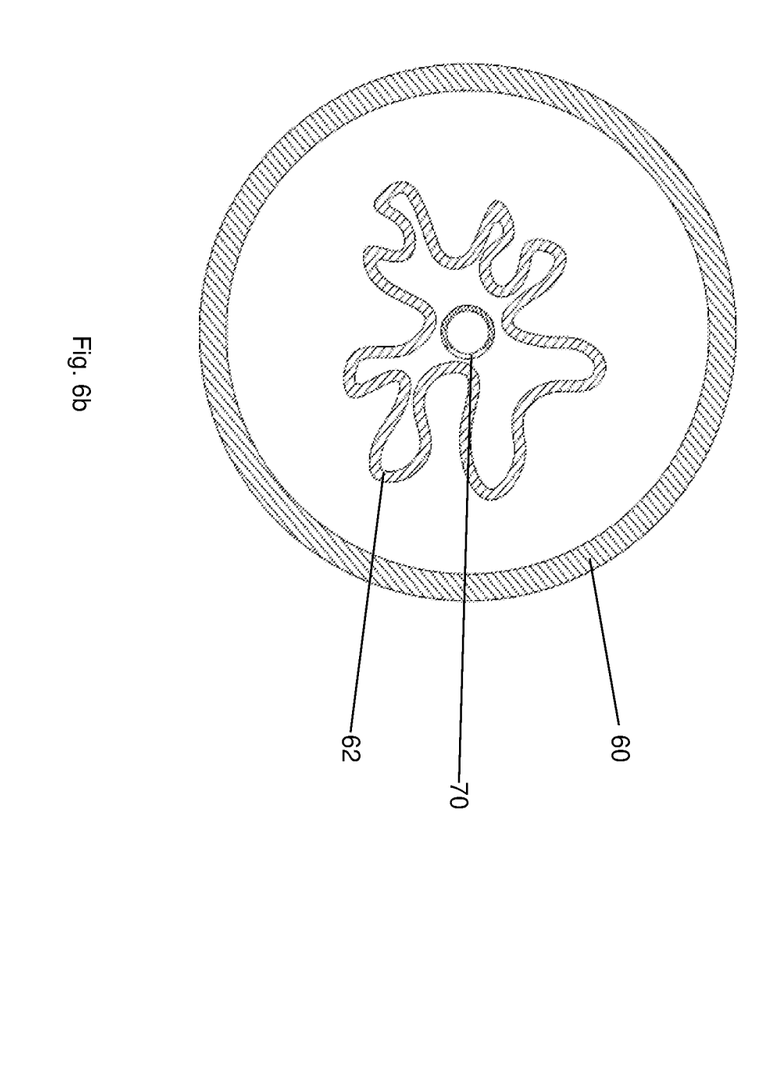
FIG. 6b is a cross sectional view B-B of the breathing hose, with the breathing hose in the deflated state.
Figure 7:
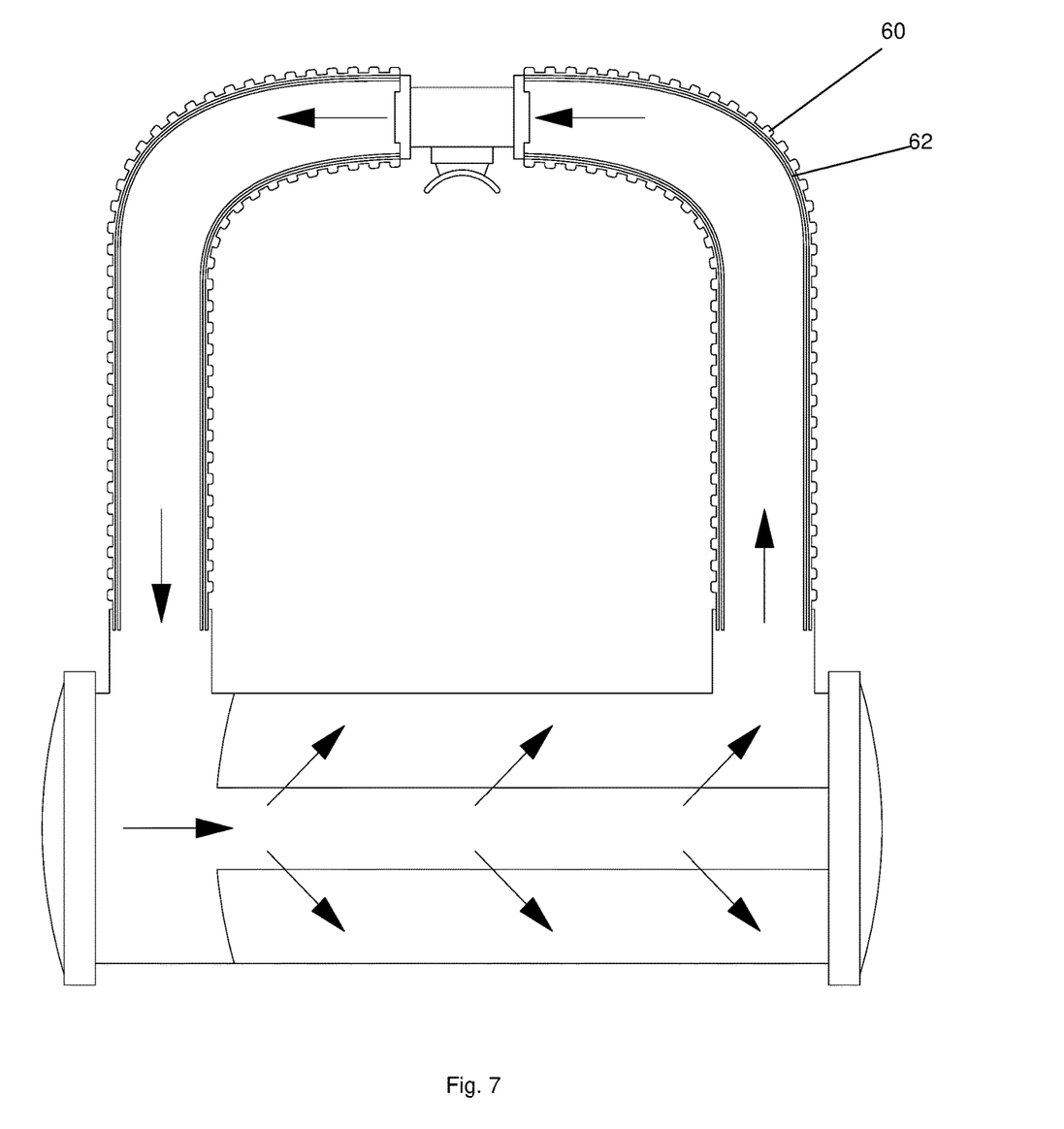
FIG. 7 is a schematic illustrating an alternative embodiment.

Referring to FIGS. 6a and 6b, a disclosed breathing hose includes a collapsible inner tube 62 located within a non-collapsible flexible outer tube 60. The collapsible inner tube 62 is configured to inflate on exhalation of breath from the lungs of the user into the hose, and subsequently the rebreather device, and to deflate on inhalation of gas from the hose and rebreather device into the lungs of the user. In this manner, the collapsible inner tube 62 provides an in-hose counterlung function.

Referring to FIGS. 2 to 8, a disclosed breathing hose is depicted in situ as part of a rebreather device.

Figure 2:
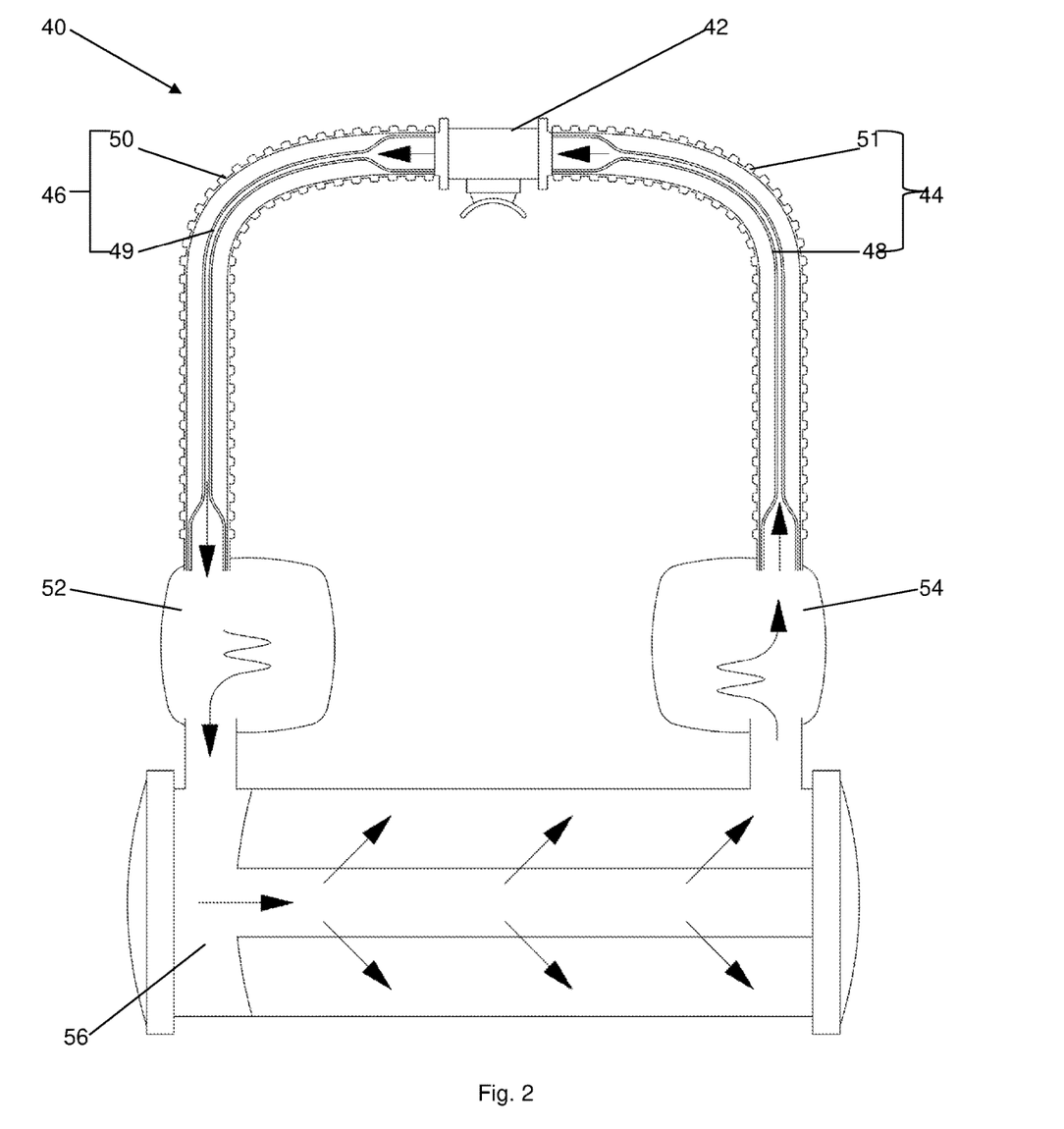
FIG. 2 is a schematic illustrating a first embodiment breathing hose in use with the inner tube in a deflated state.
Figure 3:
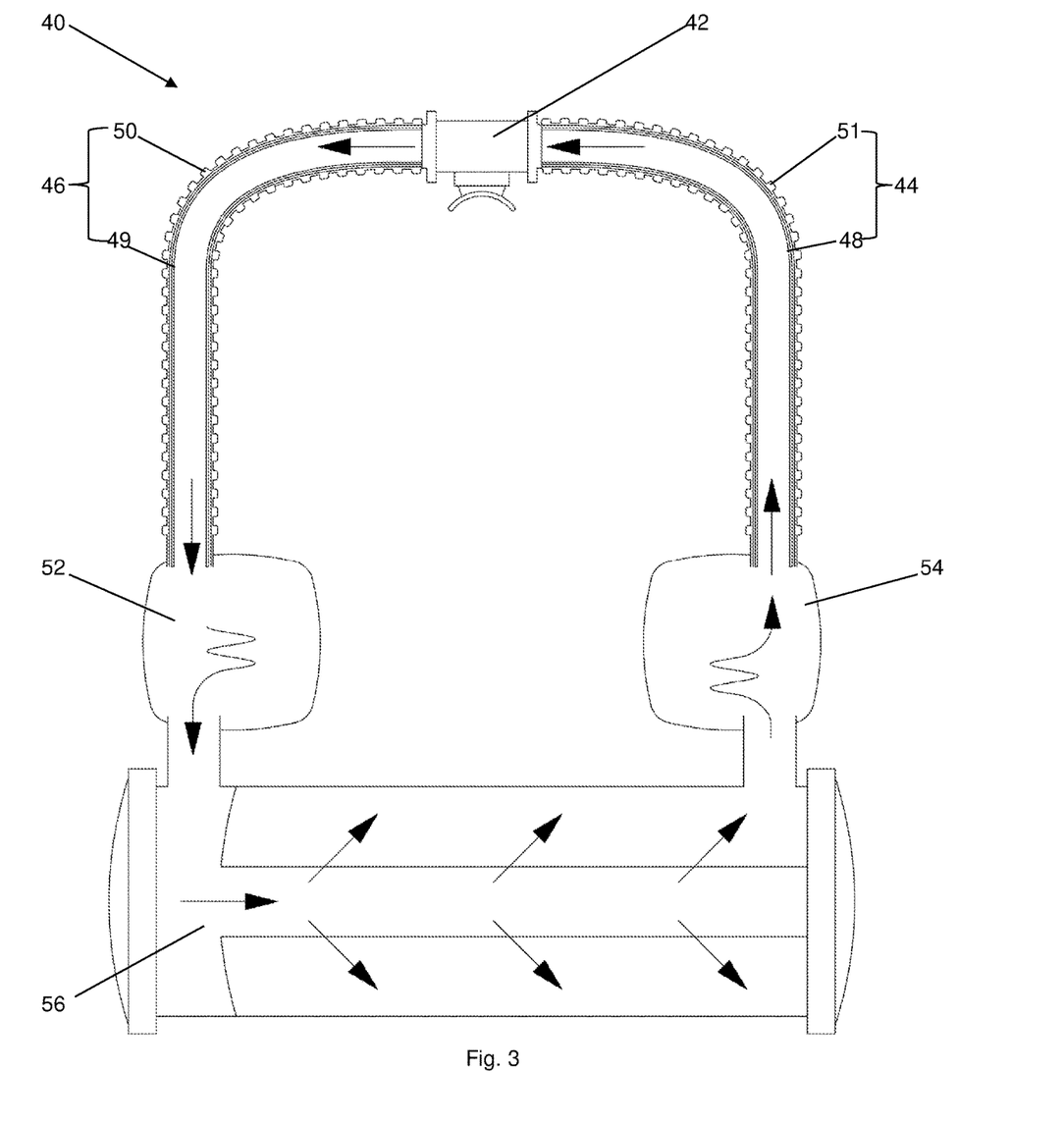
FIG. 3 is a schematic illustrating the first embodiment of the breathing hose in use with the inner tube in an inflated state.
Figure 4:
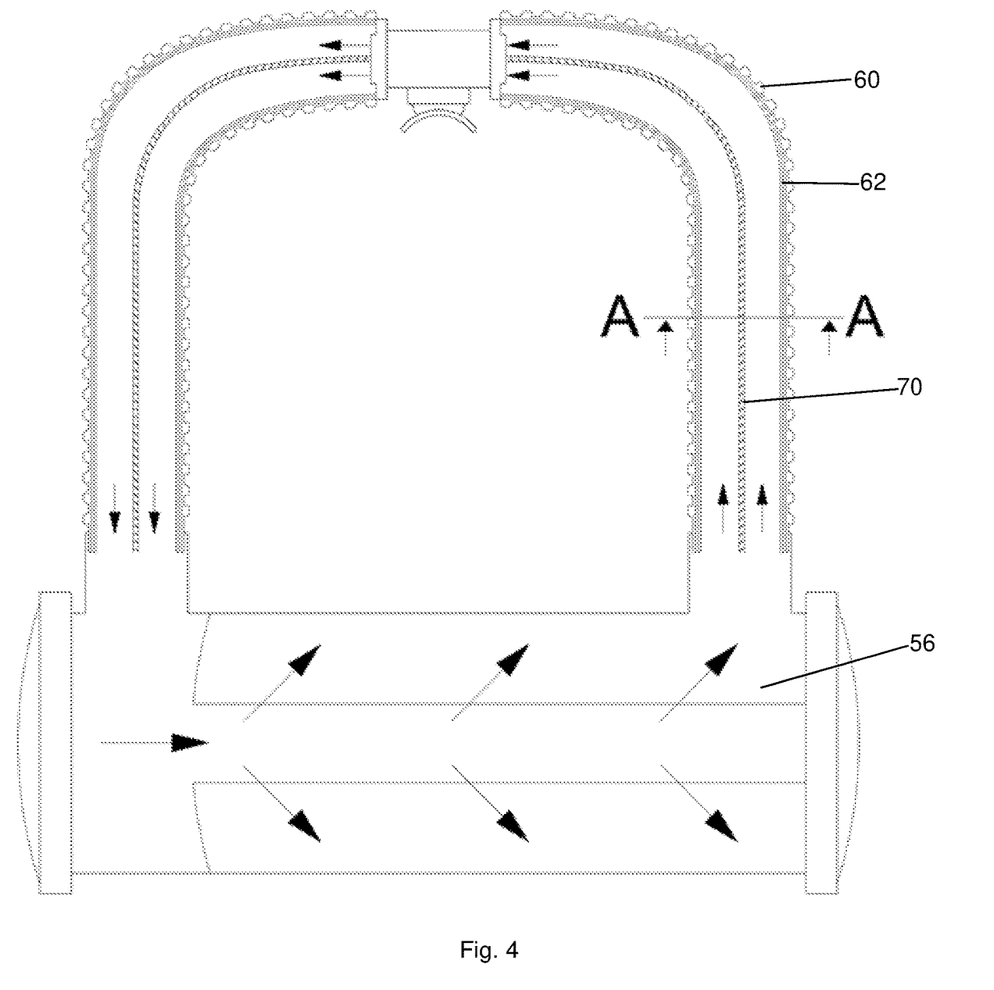
FIG. 4 is a schematic illustrating a second embodiment of a breathing hose in use, with the inner tube in the inflated state.
Figure 5:
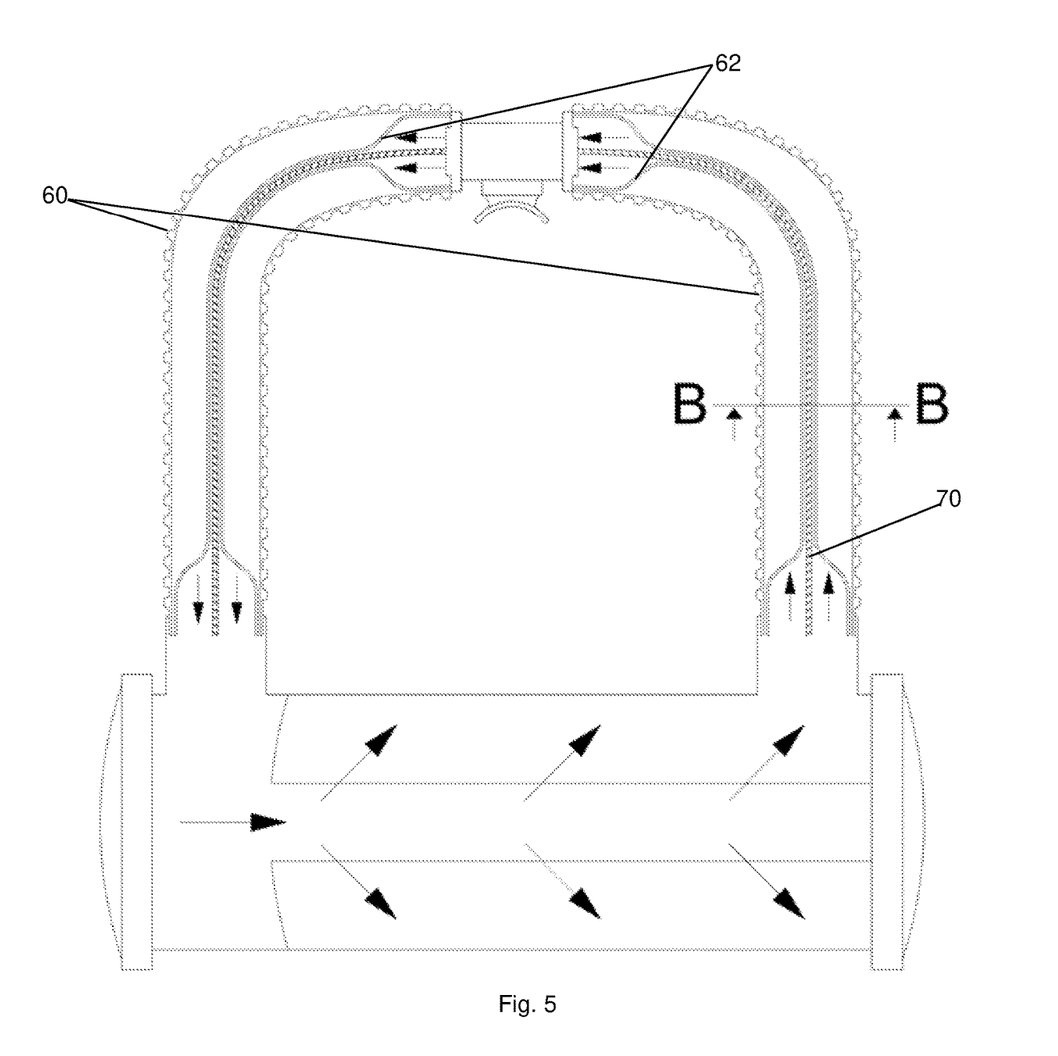
FIG. 5 is a schematic illustrating a second embodiment of the breathing hose in use, with the inner tube in the deflated state.

Referring to FIGS. 2 and 3, and in one embodiment, the disclosed breathing hose is employed in conjunction with a traditional counterlung. In this embodiment the rebreather device 40 includes a mouthpiece 42 (or full face mask, not shown) through which the diver breathes, connected to an inhale hose 44 and an exhale hose 46. Each inhale hose 44, and exhale hose 46 includes a collapsible inner tube 48, 49 housed within a non-collapsible flexible outer tube 50, 51. The hoses 44, 46 are connected to counterlungs 52, 54 which in turn are connected to a scrubber device 56. It will however be noted that the size of the counterlungs 52, 54 in this embodiment are smaller than the counterlungs 18, 20 in the traditional rebreather device as depicted in FIG. 1. This is due to the fact that the collapsible inner tubes 48, 49 act as in-hose counterlungs, inflating to accommodate at least a portion of the breath volume of the user, and so the external counterlungs 52, 54 are not required to be sized to accommodate the maximum breath volume of the user. The volume of the counterlung can therefore be reduced by the volume of the breathing hoses, for example, typical exhalation and inhalation hoses have an inner diameter of around 40 mm and a length of around 600 mm each, providing a total internal volume of about 1.5 liters. In this example, the combined counterlung volume could therefore be reduced by 1.5 liters.

Further, increasing the inner diameter of the breathing hoses from 40 mm to 60 mm would increase the volume of the breathing hoses from 1.5 liters up to 3.4 liters, allowing a counterlung volume reduction of 3.4 liters in the process.

In FIG. 2, the inner tubes 48, 49 are in the collapsed/deflated state, following an inhalation of breath by the user, and in FIG. 3 the inner tubes, 48, 49 are inflated to accommodate the exhaled breath of the user.

Referring to FIGS. 4 to 8, the diameter of the breathing hose 60, and subsequently that of the inner tube 62, has been increased. This results in the inner tube 62 having a larger volume. In such an embodiment, it is envisaged that the inner tube can replace the external counterlung, which has been removed entirely. For example, increasing the inner diameter of the breathing hoses from 40 mm to 80 mm will increase the volume of the breathing hoses from about 1.5 liters up to over 6 liters, potentially replacing the counterlung altogether. This allows for a significant improvement in the diver's streamlining.

Referring to FIGS. 4, 5, and 6a and 6b, a hollow member 70 may be located within the collapsible inner tube 62, to prevent the complete collapse of the inner tube 62 under hydrostatic pressure.

Figure 8:
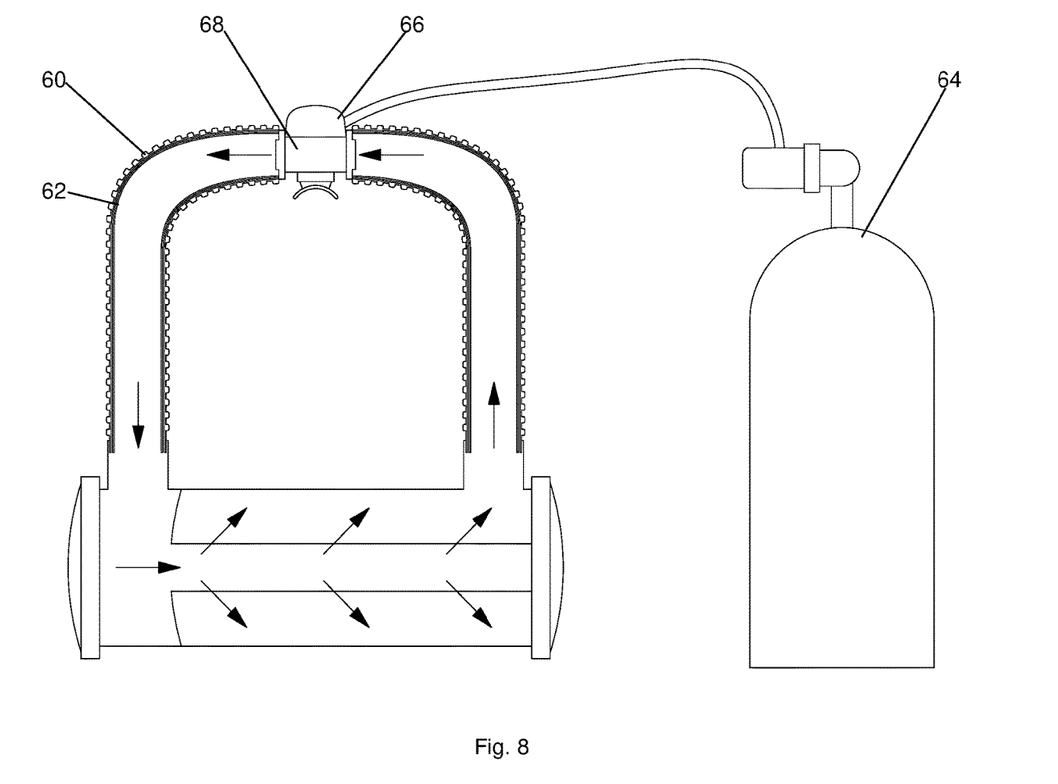
FIG. 8 is a schematic illustrating a further alternative embodiment.

Referring to FIG. 8, an in-hose counterlung may be employed in combination with a type of semi closed circuit rebreather, which allows for the system volume to be lower than the lung tidal volume, by injecting additional breathing gas from an external air tank 64 into the system as required, by means of a demand valve 66 ideally located within the mouthpiece 68. The demand valve could alternatively be positioned anywhere in the breathing loop.

In all of the above embodiments, because the counterlung is located in-hose, just past the mouthpiece or mask, the vertical distance between the diver's lungs and the counterlung is significantly reduced. This results in a reduction in the work of breathing.

A second major benefit of the disclosed embodiments is that the overall bulk is reduced, leading to a more streamlined, efficient diver profile.

In addition, as previously discussed, the total air volume of the breathing loop of a traditional rebreather system includes the counterlung volume (movable portion) as well as the breathing hose volume (immovable portion). This large air volume requires the diver to use lead ballast in order to counteract the buoyant lift of the air volume. The disclosed in-hose counterlung eliminates the immovable portion and therefore reduces the overall volume of the breathing loop, requiring less lead ballast and leading to a smaller, lighter and more streamlined system.

Numerous modifications are possible without departing from the scope of the disclosure, for example, the collapsible inner tube may be in-elastic, with no bias in either the full or empty state, alternatively the collapsible inner tube may be pre-formed with a memory to create positive and/or negative pressure to counteract hydrostatic pressure imbalances, further alternatively, the inner tube may be elastic so as to bias the gas to move through the rebreather apparatus towards the inhale hose.

The invention claimed is:

1. A breathing hose configured to duct inhaled and exhaled gas between a user and a rebreather apparatus, the breathing hose comprising:
a non-collapsible flexible outer tube; and
a collapsible inner tube located within the non-collapsible flexible outer tube, wherein a first end of the collapsible inner tube is affixed about an interior of the non-collapsible flexible outer tube at a first location and a second end of the collapsible inner tube is affixed about the interior of the non-collapsible flexible outer tube at a second location, the collapsible inner tube being configured for fluid communication with a mouthpiece of the rebreather apparatus;
wherein the collapsible inner tube is configured to inflate between its first and second ends and expand to the interior of the non-collapsible flexible outer tube between the first location and the second location to accommodate the exhaled gas of the user passing through the mouthpiece, and to deflate to accommodate the inhaled gas of the user passing through the mouthpiece.

2. The breathing hose of claim 1, wherein the collapsible inner tube has a size that is configured to accommodate at least a portion of a breath volume of the user.

3. The breathing hose of claim 2, wherein the collapsible inner tube has a size that is configured to accommodate a maximum breath volume of the user.

4. The breathing hose of claim 1, wherein the collapsible inner tube is made of a non-stretch material having no bias in either the full or empty state.

5. The breathing hose of claim 1, wherein the collapsible inner tube is pre-formed with a memory to create positive and/or negative pressure to counteract hydrostatic pressure imbalances.

6. The breathing hose of claim 1, wherein the breathing hose further comprises an inhale hose and an exhale hose, and
wherein the collapsible inner tube is made of an elastic material to thereby bias gas to move through the rebreather apparatus toward the inhale hose.

7. The breathing hose of claim 1, further comprising:
a hollow member located inside the collapsible tube, the hollow member extending along at least part of a length of the collapsible inner tube,
wherein the hollow member is configured to prevent complete collapse of the inner tube under hydrostatic pressure.

8. The breathing hose of claim 7, wherein the hollow member comprises a hollow tube or a spiral.

9. The breathing hose of claim 1, wherein the collapsible inner tube is configured to function as an in-hose counterlung.

10. The breathing hose of claim 1, wherein the collapsible inner tube is configured to act, along with the rebreather unit, to maintain a constant total volume of gas in the lungs of the user and in the rebreather unit throughout a breathing cycle.

11. The breathing hose of claim 1, wherein the collapsible inner tube is configured to perform functions of a counterlung to thereby act to maintain a constant total volume of gas in the lungs of the user and in the rebreather unit throughout a breathing cycle.

12. The breathing hose of claim 1, wherein the breathing hose is configured to act as a counterlung in the rebreather apparatus.

13. A method of using a breathing hose configured to duct inhaled and exhaled gas between a user and a rebreather apparatus, the breathing hose including a non-collapsible flexible outer tube and a collapsible inner tube located within the non-collapsible flexible outer tube, the method comprising:
connecting the breathing hose to a rebreather apparatus, wherein the collapsible inner tube of the breathing hose is configured for fluid communication with a mouthpiece of the rebreather apparatus and the collapsible inner tube is configured to inflate between a first end of the collapsible inner tube affixed about an interior of the non-collapsible flexible outer tube at a first location and a second end of the collapsible inner tube affixed about the interior of the non-collapsible flexible outer tube at a second location and expand to the interior of the non-collapsible flexible outer tube between the first location and the second location to accommodate the exhaled gas of the user passing through the mouthpiece, and to deflate to accommodate the inhaled gas of the user passing through the mouthpiece;
further connecting the breathing hose to an external air tank to thereby form a closed circuit rebreather apparatus or a semi closed circuit rebreather apparatus;
recycling unused oxygen and nitrogen in a user's breath as the user breathes air supplied by the closed circuit rebreather apparatus or semi closed circuit rebreather apparatus;
injecting oxygen from the external air tank into the breathing hose to thereby compensate for metabolic usage of oxygen by the user from the inhaled gas; and
removing carbon dioxide from the exhaled gas.

* * * * *